March 27, 1951  F. MASSA  2,546,313

TESTING INSTRUMENT FOR ACOUSTIC DEVICES

Filed Dec. 26, 1946

INVENTOR.
FRANK MASSA
BY
Eber J. Hyde
ATTORNEY

Patented Mar. 27, 1951

2,546,313

UNITED STATES PATENT OFFICE 2,546,313

TESTING INSTRUMENT FOR ACOUSTIC DEVICES

Frank Massa, Cleveland Heights, Ohio, assignor to The Brush Development Company, Cleveland, Ohio, a corporation of Ohio Application December 26, 1946, Serial No. 718,583

1 Claim. (Cl. 179—110)

My invention pertains to an acoustic instrument for measuring the output of acoustic devices such as headphones, insert ear phones and the like.

An object of my invention is to provide an instrument for measuring acoustic energy.

Another object of my invention is to provide an instrument for measuring acoustic energy which is substantially devoid of ambiguity due to the compliance of the measuring transducer.

Other objects and a fuller understanding of my invention may be had by referring to the following specification and claim when read in conjunction with the drawings, wherein:

Figure 1:
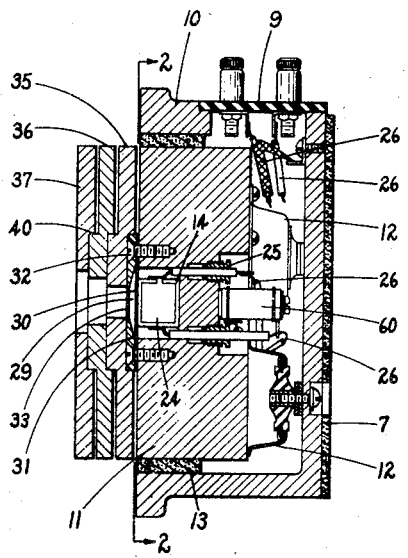
Figure 1 is a sectional side view taken along line 1—1 of Figure 2, showing one form of my instrument.

In the design and manufacture of an acoustic device, such as an insert earphone or a headphone, it is often desirable to measure the total acoustic output of the device at various frequencies within the range of its operation. To facilitate such a measurement there has been provided an instrument known as an "Artificial Ear" which comprises a body having a cavity of known size to which the phone to be measured is closely coupled. Within the cavity there is a transducer for generating a voltage proportional to the amplitude of the acoustic pressure therein, the output of the transducer being connected to suitable amplifying means and to suitable means for measuring the intensity of the pressure. Means were provided for calibrating the instrument.

In the construction of these previous instruments an attempt was made to approximate a human ear, and a large number of ears were studied to determine the size of an average ear cavity and the values of the resistances and reactances of the ears looking into the auditory canal. Studies were also made of the damping effect of the human ear and the artificial ears were constructed so as to approximate the human ear in this respect.

It has been found that human ears vary to a considerable extent, not only in their resistive and reactive values but also in their cavity size and in their damping characteristics. (See the book "Applied Acoustics" by Harry Olson and Frank Massa, second edition, page 286, where data on the variation in male human ears is presented in connection with a design for an "Artificial Ear.")

I have found in the practical design of an artificial ear that due to this wide variation in ear characteristics it is far better to make a reliable acoustic instrument than it is to attempt to design an "average" ear. To this end I provide an acoustic measuring instrument which may be produced in quantity lots, the characteristics of which will not vary appreciably from instrument to instrument, nor will the characteristics of any given instrument vary over a period of time or with changing weather conditions, such as is sometimes the case where damping material is embodied in the "ear."

The prior art "Ears" utilized either a condenser microphone (see Olson and Massa referred to above), or a piezoelectric transducer sold under the trade-mark "Sound Cell," shown and described in United States Patents 2,105,010 and 2,105,011, issued, respectively, in the names of Charles B. Sawyer and A. L. W. Williams. In each of these constructions considerable damping material was associated with the cavity of known size in an attempt to approximate the damping present in the human ear, and in each of these prior devices the stiffness of the transducer element was low compared to the stiffness of the transducer which I provide, and in these prior devices the stiffness of the transducer element was not high compared to the stiffness of the cavity of known size, as it is in my "ear."

The "artificial ear" which I provide utilizes an expander piezoelectric element which is very stiff compared to the stiffness of the cavity of known size. This makes it possible to more accurately measure acoustic pressures throughout the frequency range of the phones being tested, and provides an instrument which will repeat measurements on a given phone with negligible inaccuracies. Further, because the instruments can successfully be made in production lots with only little variation between instruments it is possible for a company manufacturing hearing aids, for example, to compare the characteristics of various different kinds of ear inserts, and to check their production ear inserts to make sure that they meet specifications as to acoustic output. The instrument, in its design, is sufficiently close to the human ear that a reasonable record can be made of what the human ear would hear from a given acoustic device being tested.

In Figure 1 of the drawings my invention is shown as comprising a cup-shaped housing 10 within which a massive base 11 is mounted by means of a plurality of vibration isolators 12 of the type generally known as Lord mountings. Between the inside surface of the wall of the housing 10 and the massive base 11 there is positioned a ring of felt 13 or other such material to center the base 11 within the cup-shaped housing 10. By this construction the transducer within the massive base 11 is effectively isolated from vibration and from shocks and jars transmitted to it through the housing 10. Four terminal posts 20, 21, 22 and 23 extends through the side wall of the housing 10 to the inside thereof whereby four wires may be brought into the interior of the housing. The terminal posts extend through an insulator 9, formed of a phenolic condensate material known as "Bakelite" or other similar material, which is connected across an opening in the side-wall of the housing 10. A thin layer of felt 7 is connected to the outside bottom surface of the housing 10 to prevent scratching of the surface on which it rests.

The massive base 11 includes a hollow 8 and piezoelectric expander means 14 is mounted within the hollow 8 with one of its directions of expansion and contraction perpendicular to the flat bottom of the hollow portion. Preferably, the crystal means 14 substantially fills the hollow 8 in the base and one of its faces lies in the plane of the lip of the hollow 8. Electrodes 24 are provided on two of the faces of the expander crystal means in such a manner that the crystal will expand and contract in a direction perpendicular to the bottom of the massive base 11 when an alternating current is applied to the electrodes, as is well known to the art. Leads 27 are connected to the electrodes 24 and extend through the packing glands 25 to the outside of the base 11 where they connect to wires 26 which extend to the terminals 20, 21, 22 and 23.

Figure 4:
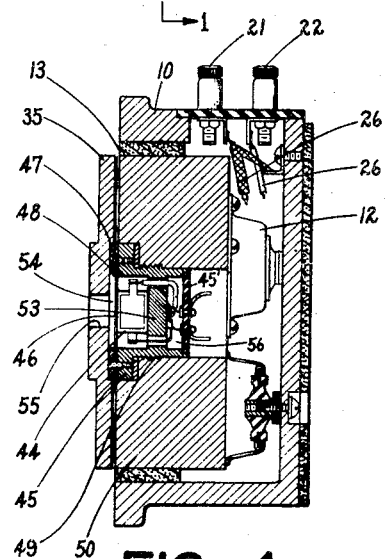
Figure 4 is a sectional side view, similar to Figure 1, of still another modified form of my instrument.
Figure 5:
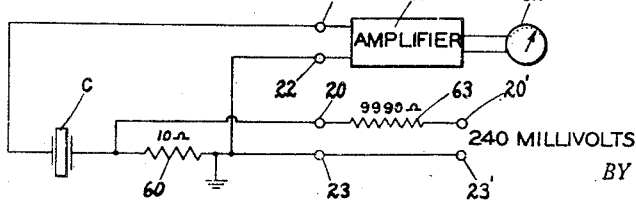
Figure 5 is a schematic wiring diagram showing how my instrument may be calibrated.

Inasmuch as a schematic wiring diagram is shown in Figure 5 and is later described in detail, no attempt has been made in Figures 1 to 4 to show the exact wiring of the device. To do so it is believed would only cause confusion in the drawings.

The face of the piezoelectric crystal 14 which lies substantially in the plane of the lip of the hollow 8 is cemented to a diaphragm 30 and the peripheral edge of the diaphragm is connected to the massive base 11 by means of a ring 31 and screws 32 which extend through the ring 31 and through the diaphragm 30 to the base 11. The ring 31 is countersunk so that the heads of the screws lie flush with the outside surface of the ring, and the ring 31 at the location where the crystal 14 is connected to the diaphragm 30 is positioned away from the diaphragm so that a cavity of known volume is provided between the plate 31 and the diaphragm 30. The plate 31 has an opening 33 through it by means of which the cavity 29 of known volume communicates with the outside.

The diaphragm 30 and the crystal 14 comprise transducer means which generate a voltage proportional to the acoustic pressure which exists within the cavity 29.

A phone to be tested is adapted to be closely coupled to the cavity through the opening 33, and a plurality of plates 35, 36 and 37 are provided which removably fit over the ring 31 and over each other in such a manner that the volume of the cavity 29 may quickly and easily be changed. Each of the plates 35, 36 and 37 has a shoulder 40 that engages the outside edge of the ring 31 to hold it in place, and in practice a quantity of petroleum jelly is applied to the plates 35, 36, 37 and to the outside surface of the massive base 11 to seal the space between the plate 35 and the base and between the several plates. This jelly also serves to hold the plates on. It may be pointed out, however, that the preferred position of the instrument during the operation is with the cavity opening 33 extending upwardly. Each of the plates 35, 36, 37 has an opening located at its center portion so that when it is in position with its shoulder 40 engaging its counterpart in the plate underneath it, its opening registers with the opening 33, thereby increasing the volume of the cavity 29. Thus any one of the three plates 35, 36, 37 may be positioned directly over the ring 31, and a wide variation in the volume of the cavity 29 is obtainable.

For example, in a practical design I have found it convenient to have the cavity lying between the ring 31 and the diaphragm 30, one cubic centimeter. The volume of the opening in the plate 35 which registers with the opening 33 through the ring 31 preferably is one cubic centimeter, and the volumes of the openings in the other two plates 36, 37 two cubic centimeters each. Accordingly, by moving the plates 35, 36 and 37 around or by using only some of them, it is possible to get cavities of one cubic centimeter, two cubic centimeters, 3 cubic centimeters, 4 cubic centimeters, 5 cubic centimeters and 6 cubic centimeters.

The holes through the plates 35, 36, and 37 which make up the cavity of known size preferably are round, and the diameter of the hole in a given plate should approximate the axial dimension of the cavity from the diaphragm 30 to the outside face of the given plate in order that between the walls of the cavity there will be minimum path length and minimum standing waves with their consequent pressure peaks. The ideal cavity shape is spherical, but it is impractical to provide a plurality of spherical cavities of different sizes. However, by my design a reasonable approach to a spherical cavity is achieved.

Figure 2:
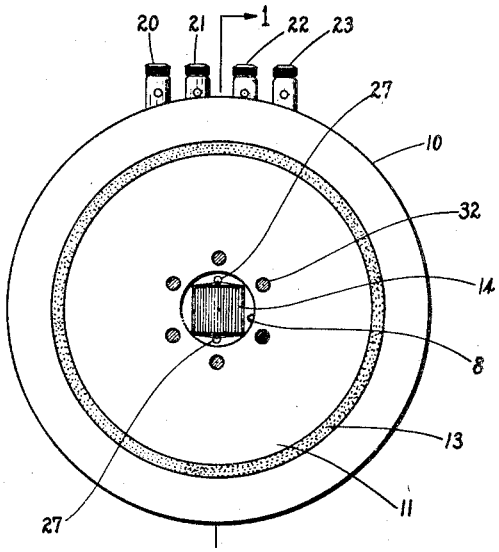
Figure 2 is a sectional plan view taken along line 2—2 of Figure 1.

The piezoelectric crystal 14 may be a single bar of crystalline material but preferably, as shown by Figure 2, it comprises a stack of expander plates interleaved with electrodes, as is known in the art. The crystalline material may be Rochelle salt, primary ammonium phosphate, lithium sulfate, or any other of a wide variety of piezoelectric crystal. If the crystal is of such a nature that it expands and contracts in two different directions upon being excited electrically, certain precautions should be taken in mounting the crystal within the massive base 11. Examples of these crystals which expand and contract in two different directions are Rochelle salt and primary ammonium phosphate. Crystals of this type should be mounted in the hollow within the base 11 in such a manner that pressure changes in the cavity of known size do not reach the side faces of the crystal, because if these pressure changes do reach the sides of the crystal the electrical output from the crystal will be materially reduced, and in some cases it may be reduced substantially to zero.

Figure 1 shows one way of mounting the crystals of the Rochelle salt and primary ammonium phosphate type. The diaphragm 30 seals the crystal 14 within the hollow portion of the base 11 and does not permit any substantial changes of pressure within the hollow in the base 11. In other words, the crystal 14 is sealed within the hollow 8 in the base 11, the diaphragm 30 serving as a sealing means as well as serving as a transmitter of pressure.

Figure 3:
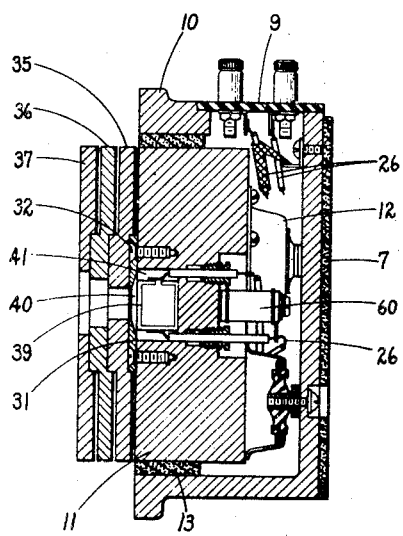
Figure 3 is a sectional side view, similar to Figure 1, of a modified acoustic instrument.

Figure 3 illustrates the method of mounting a crystal such as lithium sulfate. A property of a Z-cut plate of lithium sulfate crystal is that upon being properly electroded it expands and contracts substantially only in one direction upon being excited electrically and, conversely, when all of the faces of the plate are subjected to hydrostatic (or air) pressure it will generate a substantial voltage. Lithium sulfate has monoclinic polar symmetry and a Z-cut plate thereof has the plane of its major faces perpendicular to the polar axis of the crystalline material. This is in accordance with the standards on piezoelectric crystals, recommended terminology, I. R. E., 1945. This Z-cut is often referred to as a Y-cut. The lithium sulfate crystal 39 is so mounted in the hollow base 11 that its direction of major expansion and contraction is perpendicular to the plane of the lip of the cup-shaped base 11. When this lithium sulfate crystal is utilized, sealing means such as the diaphragm 30 of Figure 1 are no longer necessary because pressure variations on the side faces of the lithium sulfate crystal have substantially no effect on the output of the crystal so long as the length of the crystal is less than ¼ wave length at the highest frequency at which a device is to be tested. If for design purposes it is necessary to use a crystal which is ¼ wave length or longer, it should be sealed in its cavity, either by a diaphragm as in Figure 1, or by filling the cavity with a semi-solid jelly, such as petroleum jelly or with sealing wax or the like. In Figure 3, where the crystal 39 is short, the ring 31 is connected directly to the base 11 by screws 32 and no sealing means are provided around the crystal. The cavity 40 adjacent the face of the crystal may be one cubic centimeter in volume, and, as the space 41 between the crystal 39 and the base 11 becomes in effect part of the cavity of known size, it may be convenient to have the volume of the cavity 41 equal one cubic centimeter, thus making the total volume of the cavity of known size two cubic centimeters. In all other respects the device shown in Figure 3 is similar to the device in Figures 1 and 2.

Figure 4 illustrates another form of my invention wherein the transducer unit is comprised of a crystal 44 mounted within a hollow cup-shaped housing 45, and a diaphragm 46 is connected across the lip of the cup by means of the screws 47 which extend through the ring 48 into the wall of the cup. Thus the transducer unit in the instrument is easily replaceable. The crystal 44 is cemented to the diaphragm 46 similarly to the way crystal 14 in Figure 1 is cemented to the diaphragm 30. The housing 45 is circular in cross-section perpendicular to the direction of expansion and contraction of the crystal 44 and it has screw threads 49 which cooperate with a threaded bore in the massive base 50. With the transducer unit screwed in to the massive base 50 the instrument becomes substantially similar to the units shown in Figures 1 and 3, and the massive base 50 may be mounted within the cup-shaped housing 10 by vibration isolating means 12 and by the felt ring 13 as was described in connection with Figure 1.

The replaceable cup-shaped housing 45 includes a massive partition 53 between which and the diaphragm 46 the crystal 44 is mounted. The crystal leads extend through the partition 53 into a hollow 56 in the back of the unit, and from there they extend through the back plate 45' which is made of an insulating material, and wires 26 from the terminals 20, 21 are connected to the leads.

Figure 5 is a schematic wiring diagram showing the connection of the transducer and its associated amplifying and calibrating means. The crystal is indicated by the letter C and one of its electrodes is connected through a resistor 60 to ground. Its other electrode is connected to the input of an amplifier 61, and the output of the amplifier is connected to a meter 62 or other such measuring device.

In order to calibrate the instrument a 9990 ohm resistor 63 is connected to the terminal 20 in series with the resistor 60 which has a value of 10 ohms, and a voltage of 240 millivolts is applied across the terminals 20', 23' to induce 240 microvolts in the crystal circuit. If the crystal C has a sensitivity of 24 microvolts/dyne/cm.$^2$, the voltage of 240 microvolts induced in the 10 ohm resistor is electrically equivalent to the signal that would be generated when the acoustic pressure in the cavity is 10 dynes/cm.$^2$. The output reading of the voltmeter 62 is adjusted by means of a volume control on the amplifier 61 to read any desired value for the equivalent 10 dyne/cm.$^2$ sound pressure represented by the 240 microvolt calibrating signal. At this point the calibrating signal is removed and the system is ready to read absolute sound pressures generated in the cavity by a receiver under test, the value of sound pressure being determined by a simple ratio of the output meter reading to the meter reading established for the 10 dyne/cm.$^2$ calibrating signal.

While I have described my invention with a certain degree of particularity, it is to be understood that the specification and drawings are only by way of example and that changes can be made in the instrument without departing from the spirit and scope of my invention.

I claim as my invention:

An acoustic device comprising, in combination, a cup member, massive hollow base means the walls of which defining said hollow are rigid, acoustic decoupling means mounting said base means within and spaced from the walls of said cup means, an expander block of electro-transducing material substantially filling the bottom portion of the hollow in said base means, a diaphragm secured to the top face of said block of electro-transducing material and to said base means to seal said block in the bottom of said hollow with the bottom face of said block against the base means and to divide said hollow into two cavities the first of which is sealed shut and is substantially filled by said block and the second of which is open to atmosphere and is of a known size, and plate means formed of rigid material having a hole therethrough for replaceable air-tight connection to said base means with said hole in registry with the opening into said second cavity to change the known size of the second cavity to another known size, the walls of said cavities of known size being acoustically rigid compared to the stiffness of said cavities.

FRANK MASSA.

(References on following page)

REFERENCES CITED

The following references are of record in the file of this patent:

UNITED STATES PATENTS

| Number | Name | Date |
|---|---|---|
| 1,655,625 | Nicholson | Jan. 10, 1928 |
| 1,769,360 | Thomas | July 1, 1930 |
| 1,957,512 | Weinberger | May 8, 1934 |
| 1,980,888 | Thomas | Nov. 13, 1934 |
| 2,078,385 | Kato | Apr. 25, 1937 |
| 2,102,668 | Ballantine | Dec. 21, 1937 |
| 2,138,036 | Kunze | Nov. 29, 1938 |
| 2,145,449 | Lockhart | Jan. 31, 1939 |
| 2,181,132 | Kallmeyer | Nov. 28, 1939 |
| 2,237,298 | Baumzweiger | Apr. 8, 1941 |
| 2,242,755 | Pope | May 20, 1941 |
| 2,367,726 | Lybarger | Jan. 23, 1945 |
| 2,374,637 | Hayes | Apr. 24, 1945 |
| 2,413,462 | Massa | Dec. 31, 1946 |
| 2,427,062 | Massa | Sept. 9, 1947 |
| 2,472,714 | Massa | June 7, 1949 |